(12) United States Patent
Ota et al.

(10) Patent No.: US 10,744,454 B2
(45) Date of Patent: Aug. 18, 2020

(54) CARBON DIOXIDE GAS SEPARATION MEMBRANE, METHOD FOR MANUFACTURING SAME, AND CARBON DIOXIDE GAS SEPARATION MEMBRANE MODULE

(71) Applicants: SUMITOMO CHEMICAL COMPANY, LIMITED, Tokyo (JP); RENAISSANCE ENERGY RESEARCH CORPORATION, Kyoto-shi, Kyoto (JP)

(72) Inventors: Yudai Ota, Osaka (JP); Yoshihito Okubo, Pittsburgh, PA (US); Osamu Okada, Kyoto (JP); Nobuaki Hanai, Kyoto (JP); Peng Yan, Kyoto (JP); Yasato Kiyohara, Kyoto (JP)

(73) Assignees: SUMITOMO CHEMICAL COMPANY, LIMITED, Chuo-ku, Tokyo (JP); RENAISSANCE ENERGY RESEARCH CORPORATION, Kyoto-shi, Kyoto (JP)

(*) Notice: Subject to any disclaimer, the term of this patent is extended or adjusted under 35 U.S.C. 154(b) by 133 days.

(21) Appl. No.: 15/527,213

(22) PCT Filed: Nov. 17, 2015

(86) PCT No.: PCT/JP2015/082280
§ 371 (c)(1),
(2) Date: May 16, 2017

(87) PCT Pub. No.: WO2016/080400
PCT Pub. Date: May 26, 2016

(65) Prior Publication Data
US 2017/0333833 A1    Nov. 23, 2017

(30) Foreign Application Priority Data

Nov. 18, 2014 (JP) .................. 2014-233186

(51) Int. Cl.
*B01D 53/22* (2006.01)
*B01D 69/12* (2006.01)
(Continued)

(52) U.S. Cl.
CPC .......... *B01D 53/22* (2013.01); *B01D 53/228* (2013.01); *B01D 67/0079* (2013.01);
(Continued)

(58) Field of Classification Search
CPC ...... B01D 69/10; B01D 71/38; B01D 69/125; B01D 67/0079; B01D 53/22; B01D 71/40;
(Continued)

(56) References Cited

U.S. PATENT DOCUMENTS

| | | | |
|---|---|---|---|
| 5,445,669 A | | 8/1995 | Nakabayashi et al. |
| 5,540,741 A | * | 7/1996 | Gozdz .................. C08J 9/28 29/623.5 |

(Continued)

FOREIGN PATENT DOCUMENTS

| | | |
|---|---|---|
| CN | 103702747 A | 4/2014 |
| EP | 0629411 A1 | 12/1994 |

(Continued)

OTHER PUBLICATIONS

Office Action dated Jul. 16, 2018 from U.S. Patent & Trademark Office in U.S. Appl. No. 15/503,228.
(Continued)

*Primary Examiner* — Anthony R Shumate
(74) *Attorney, Agent, or Firm* — Sughrue Mion, PLLC (57) ABSTRACT

Provided are a $CO_2$ gas separation membrane, a method for manufacturing the same, and a carbon dioxide gas separa-
(Continued)

tion membrane module including the same, the $CO_2$ gas separation membrane including: a first layer (A) containing at least one alkali metal compound selected from the group consisting of an alkali metal carbonate, an alkali metal bicarbonate and an alkali metal hydroxide, and a first resin in which a polymer having a carboxyl group has been crosslinked; a second layer (B) containing at least one of the alkali metal compounds, and a second resin having a structural unit derived from a vinyl ester of a fatty acid; and a hydrophobic porous membrane (C).

16 Claims, 2 Drawing Sheets

(51) Int. Cl.
| | | |
|---|---|---|
| *B01D 71/38* | (2006.01) | |
| *B01D 71/40* | (2006.01) | |
| *C08F 16/06* | (2006.01) | |
| *C08L 29/04* | (2006.01) | |
| *B01D 69/14* | (2006.01) | |
| *B01D 67/00* | (2006.01) | |
| *B01D 69/10* | (2006.01) | |

(52) U.S. Cl.
CPC ............. *B01D 69/10* (2013.01); *B01D 69/12* (2013.01); *B01D 69/142* (2013.01); *B01D 69/148* (2013.01); *B01D 71/38* (2013.01); *B01D 71/40* (2013.01); *C08F 16/06* (2013.01); *C08L 29/04* (2013.01); *B01D 69/125* (2013.01); *Y02C 10/04* (2013.01); *Y02C 10/10* (2013.01)

(58) Field of Classification Search
CPC .. B01D 53/228; B01D 69/142; B01D 69/148; B01D 69/12; Y02C 10/04; Y02C 10/10; C08L 29/04; C08F 16/06
See application file for complete search history.

(56) References Cited

U.S. PATENT DOCUMENTS

| | | | |
|---|---|---|---|
| 6,315,968 B1 | 11/2001 | Quinn et al. | |
| 7,906,143 B1 | 3/2011 | Odidi et al. | |
| 2001/0030127 A1 | 10/2001 | Li et al. | |
| 2005/0159571 A1 | 7/2005 | Hamamoto et al. | |
| 2011/0036237 A1 | 2/2011 | Okada et al. | |
| 2012/0107899 A1* | 5/2012 | Borchert ................ | B01D 53/62 435/174 |
| 2012/0297976 A1 | 11/2012 | Sano | |
| 2013/0059365 A1* | 3/2013 | Henderson ......... | B01D 53/1425 435/266 |
| 2013/0149771 A1* | 6/2013 | Borchert .................. | C12N 9/88 435/232 |
| 2013/0199370 A1 | 8/2013 | Okada et al. | |
| 2013/0287678 A1 | 10/2013 | Okada et al. | |
| 2014/0137740 A1 | 5/2014 | Aburaya et al. | |
| 2014/0260986 A1 | 9/2014 | Ishizuka et al. | |
| 2014/0352540 A1 | 12/2014 | Okada et al. | |
| 2015/0015124 A1 | 1/2015 | Rajasingham | |
| 2015/0151243 A1 | 6/2015 | Okada et al. | |
| 2015/0151244 A1* | 6/2015 | Ishizuka ................ | B01D 53/22 422/212 |
| 2015/0283518 A1 | 10/2015 | Hirose et al. | |
| 2016/0008764 A1* | 1/2016 | Yoneyama ............. | B01D 69/10 427/8 |
| 2016/0008765 A1* | 1/2016 | Aburaya ................ | B01D 69/12 96/11 |
| 2016/0008766 A1* | 1/2016 | Aburaya ................ | B01D 63/10 422/222 |
| 2016/0008767 A1 | 1/2016 | Yoneyama | |
| 2016/0008768 A1 | 1/2016 | Yoneyama et al. | |
| 2018/0133654 A1* | 5/2018 | Kodama ................ | B01D 63/10 |

FOREIGN PATENT DOCUMENTS

| | | |
|---|---|---|
| EP | 2985072 A1 | 2/2016 |
| JP | 63126506 A | 5/1988 |
| JP | 6470125 A | 3/1989 |
| JP | 0788171 A | 4/1995 |
| JP | 07-112122 A | 5/1995 |
| JP | 08-193156 A | 7/1996 |
| JP | 8229367 A | 9/1996 |
| JP | 08243364 A | 9/1996 |
| JP | 09267017 A | 10/1997 |
| JP | 2003268009 A | 9/2003 |
| JP | 2008036463 A | 2/2008 |
| JP | 2008036464 A | 2/2008 |
| JP | 2009195900 A | 9/2009 |
| JP | 2011-183379 A | 9/2011 |
| JP | 201327841 A | 2/2013 |
| JP | 2013027806 A | 2/2013 |
| JP | 2013027850 A | 2/2013 |
| JP | 2013-049048 A | 3/2013 |
| JP | 2013111507 A | 6/2013 |
| JP | 2014-195761 A | 10/2014 |
| JP | 2014-195762 A | 10/2014 |
| JP | 2015-061721 A | 4/2015 |
| TW | 201442777 A | 11/2014 |
| WO | 2009093666 A1 | 7/2009 |
| WO | 2012/014900 A1 | 2/2012 |
| WO | 2012086836 A1 | 6/2012 |
| WO | 2014054619 A1 | 4/2014 |
| WO | 2014/065387 A1 | 5/2014 |
| WO | 2014157069 A1 | 10/2014 |
| WO | 2016024523 A1 | 2/2016 |
| WO | 2016080400 A1 | 5/2016 |

OTHER PUBLICATIONS

International Search Report of PCT/JP2015/082280 dated Feb. 9, 2016.
Communication dated May 29, 2018, from European Patent Office in counterpart application No. 15861252.3.
Communication dated Oct. 8, 2018 from the State Intellectual Property Office of the P.R.C. in counterpart Application No. 201580043095.8.
Communication dated Feb. 21, 2018, from European Patent Office in counterpart application No. 15832072.1.
Office Action dated Mar. 14, 2018, which issued during the prosecution of U.S. Appl. No. 15/503,228.
International Search Report of PCT/JP2015/072382 dated Oct. 20, 2015.
Communication dated Feb. 19, 2019, from the Taiwanese Intellectual Property Office in counterpart application No. 104138033.
Communication dated May 27, 2019, from the China National Intellectual Property Administration in Application No. 201580043095.8 (counterpart of U.S. Appl. No. 15/503,228).
Communication dated Jul. 9, 2019, from the European Patent Office in counterpart European Application No. 15861252.3.
Communication dated Aug. 27, 2019, from the Japanese Patent Office in counterpart application No. 2016-560243.
Communication dated Aug. 27, 2019, from the Taiwanese Patent Office in counterpart application No. 104138033.
Communication dated Apr. 7, 2020, from the European Patent Office in application No. 15 832 072.1.
Communication dated Mar. 20, 2020, from the Taiwanese Intellectual Property Office in application No. 104138033.

* cited by examiner

CARBON DIOXIDE GAS SEPARATION MEMBRANE, METHOD FOR MANUFACTURING SAME, AND CARBON DIOXIDE GAS SEPARATION MEMBRANE MODULE

CROSS REFERENCE TO RELATED APPLICATIONS

This application is a National Stage of International Application No. PCT/JP2015/082280 filed Nov. 17, 2015, claiming priority based on Japanese Patent Application No. 2014-233186 filed Nov. 18, 2014, the contents of all of which are incorporated herein by reference in their entirety.

TECHNICAL FIELD

The present invention relates to a gas separation membrane for separating $CO_2$ from a gas mixture that contains at least $CO_2$ and water vapor, a method for manufacturing the membrane, a gas separation membrane module including the gas separation membrane, and others.

BACKGROUND ART

Gas membrane separation processes have received attention in recent years because of their capability of achieving energy conservation when used as a process for separating $CO_2$ from various gases such as natural or exhaust gases as well as synthetic gases that are synthesized in large-scale plants for hydrogen or urea production.

Various separation membranes have been hitherto proposed as gas separation membranes for use in these gas membrane separation processes. For example, it is proposed in Japanese Patent Laying-Open No. 07-112122 (PTD 1) that a carbon dioxide separating gel membrane may be made of a hydrogel membrane formed by having an aqueous solution containing a carbon dioxide carrier absorbed in a vinyl alcohol-acrylic acid salt copolymer having a cross-linked structure. The invention of PTD 1 employs the vinyl alcohol-acrylic acid salt copolymer as a polymeric material that can hydrogelate by absorption of an aqueous solution containing a carbon dioxide carrier; this overcomes disadvantages of conventionally known polymer electrolytes such as polyacrylic acids that have high water absorption capacity but have poor strength that makes it difficult to obtain a membrane form. Thus, the invention of PTD 1 provides a carbon dioxide-facilitated transport membrane of practical use and a method for manufacturing the membrane.

Examples of gas separation membranes that employ a polyacrylic acid as a hydrogelable polymeric material include a $CO_2$ separation film proposed in Japanese Patent Laying-Open No. 08-193156 (PTD 2), which film may be formed from a resin composition including a reaction mixture obtained by reacting a polyacrylic acid with a predetermined equivalent of aliphatic amine. It is proposed in Japanese Patent Laying-Open No. 2013-049048 (PTD 3) that a $CO_2$-facilitated transport membrane may be made by depositing a gel layer onto a heat-resistant porous membrane, the gel layer having glycine and a deprotonating agent contained in a hydrogel membrane.

CITATION LIST

Patent Document

PTD 1: Japanese Patent Laying-Open No. 07-112122
PTD 2: Japanese Patent Laying-Open No. 08-193156
PTD 3: Japanese Patent Laying-Open No. 2013-049048

SUMMARY OF INVENTION

Technical Problems

However, those gas separation membranes proposed hitherto have been still unsatisfactory in their $CO_2$ permeance and $CO_2$ selectivity.

It is an object of the present invention to provide a gas separation membrane having high $CO_2$ permselectivity and a method for manufacturing the membrane; and a gas separation membrane module and a gas separation apparatus including the gas separation membrane.

Solutions to Problems

The present invention provides a $CO_2$ gas separation membrane, a method for manufacturing the $CO_2$ gas separation membrane, a method for separating $CO_2$, a $CO_2$ gas separation membrane module and a $CO_2$ gas separation apparatus described below.

[1] A $CO_2$ gas separation membrane, including:
a first layer (A) containing at least one alkali metal compound selected from the group consisting of an alkali metal carbonate, an alkali metal bicarbonate and an alkali metal hydroxide, and a first resin in which a polymer having a carboxyl group has been crosslinked;
a second layer (B) containing at least one alkali metal compound selected from the group consisting of an alkali metal carbonate, an alkali metal bicarbonate and an alkali metal hydroxide, and a second resin having a structural unit derived from a vinyl ester of a fatty acid; and
a hydrophobic porous membrane (C).

[2] The $CO_2$ gas separation membrane according to [1], wherein
the second resin is a polyvinyl alcohol or vinyl alcohol-acrylic acid copolymer, the polyvinyl alcohol or the vinyl alcohol-acrylic acid copolymer being a partially saponified product of a vinyl ester of a fatty acid.

[3] The $CO_2$ gas separation membrane according to [1] or [2], wherein
a surface of the first layer (A) is in contact with a surface of the second layer (B), and a surface of the hydrophobic porous membrane (C) is in contact with one of the other surface of the first layer (A) and the other surface of the second layer (B).

[4] The $CO_2$ gas separation membrane according to [3], wherein
a weight per unit area of one of the first layer (A) and the second layer (B), which is not in contact with the hydrophobic porous membrane (C), is higher than that of the other layer in contact with the hydrophobic porous membrane (C). As used herein, the term "weight per unit area" refers to solid weight per unit area of the first layer (A) or the second layer (B).

[5] The $CO_2$ gas separation membrane according to any one of [1] to [4], wherein
the first layer (A), the second layer (B), and the hydrophobic porous membrane (C) are stacked in this order.

[6] The $CO_2$ gas separation membrane according to any one of [1] to [5], wherein
the first resin has a structural unit that is derived from an acrylic or methacrylic acid or a derivative thereof.

[7] The $CO_2$ gas separation membrane according to any one of [1] to [6], wherein
a total amount of alkali metal compounds contained in the first layer (A) and the second layer (B) is 0.5 parts by mass to 20 parts by mass based on 1 part by mass of a total amount of the first and second resins.

[8] The $CO_2$ gas separation membrane according to any one of [1] to [7], wherein
the alkali metal compounds contained in the first layer (A) and the second layer (B) are each a carbonate or hydroxide of at least one alkali metal selected from the group consisting of sodium, potassium, rubidium and cesium.

[9] The $CO_2$ gas separation membrane according to any one of [1] to [8], wherein
the alkali metal compounds contained in the first layer (A) and the second layer (B) are each cesium carbonate or cesium hydroxide.

[10] The $CO_2$ gas separation membrane according to any one of [1] to [9], wherein
the hydrophobic porous membrane (C) contains at least one material selected from the group consisting of ceramic, a fluorine-containing resin, polyphenylene sulfide, polyether sulfone, and polyimide.

[11] The $CO_2$ gas separation membrane according to any one of [1] to [10], wherein
the hydrophobic porous membrane (C) has pores with an average pore diameter of 0.005 μm to 1.0 μm.

[12] A method for manufacturing the $CO_2$ gas separation membrane according to any one of [1] to [11], including:
a first step of applying a first coating liquid containing the alkali metal compound, the first resin and a medium or a second coating liquid containing the alkali metal compound, the second resin and a medium onto at least one surface of the hydrophobic porous membrane (C);
a second step of forming the first layer (A) or the second layer (B) by removing the medium from a coating obtained in the first step;
a third step of applying one of the first coating liquid and the second coating liquid, which is different from the coating liquid used in the first step, onto a surface of the first layer (A) or the second layer (B) formed in the second step; and
a fourth step of forming the first layer (A) or the second layer (B) by removing the medium from a coating obtained in the third step.

[13] The method according to [12], wherein
the first step is a step of applying the second coating liquid onto at least one surface of the hydrophobic porous membrane (C).

[14] A method for separating $CO_2$, including the steps of:
feeding a gas mixture that contains at least $CO_2$ and water vapor on a surface side of the $CO_2$ gas separation membrane according to any one of [1] to [11]; and
recovering $CO_2$ separated from the gas mixture through the other surface side of the $CO_2$ gas separation membrane.

[15] A $CO_2$ gas separation membrane module including the $CO_2$ gas separation membrane according to any one of [1] to [11].

[16] A $CO_2$ gas separation apparatus, including:
the $CO_2$ gas separation membrane module according to [15]; and
a gas feeding part for feeding a gas mixture that contains at least $CO_2$ and water vapor to the $CO_2$ gas separation membrane module.

Advantageous Effects of Invention

The present invention can provide a gas separation membrane having high $CO_2$ permselectivity and a method for manufacturing the membrane; and a gas separation membrane module and a gas separation apparatus including the gas separation membrane.

DESCRIPTION OF EMBODIMENTS

<$CO_2$ Gas Separation Membrane and Manufacturing Method Thereof>

The $CO_2$ gas separation membrane of the present invention includes the first layer (A), the second layer (B) and the hydrophobic porous membrane (C) described below:
(A) the first layer containing at least one alkali metal compound selected from the group consisting of an alkali metal carbonate, an alkali metal bicarbonate and an alkali metal hydroxide, and a resin (first resin) in which a polymer having a carboxyl group has been crosslinked;
(B) the second layer containing at least one alkali metal compound selected from the group consisting of an alkali metal carbonate, an alkali metal bicarbonate and an alkali metal hydroxide, and a resin (second resin) having a structural unit derived from a vinyl ester of a fatty acid; and
(C) the hydrophobic porous membrane.

(First Resin)

The first resin contained in the first layer (A) includes a crosslinked resin in which a carboxyl group-containing polymer has been crosslinked. The first resin has a network structure where carboxyl group-containing polymer chains are crosslinked with each other. The first resin is preferably used for improvement of water retention property of the $CO_2$ gas separation membrane as well as enhancement of pressure capacity thereof. The $CO_2$ gas separation membrane needs to have some pressure resistance because a large pressure difference is applied as a driving force for gas permeation through the membrane. One or more types of the first resin may be used alone or in combination.

Examples of the polymer having a carboxyl group include polymers obtained by polymerization of a monomer composition including one or more carboxyl group-containing monomers such as acrylic acid, itaconic acid, crotonic acid and methacrylic acid. Specific examples of the polymer include a polyacrylic acid, a polyitaconic acid, a polycrotonic acid, a polymethacrylic acid, an acrylic acid-methacrylic acid copolymer, an acrylic acid-methyl methacrylate copolymer, and a methacrylic acid-methyl methacrylate copolymer. Especially, the polymer having a carboxyl group preferably contains a structural unit derived from an acrylic or methacrylic acid or a derivative thereof. Specifically, the polymer having a carboxyl group is preferably a polyacrylic acid that is a polymer of acrylic acid, a polymethacrylic acid that is a polymer of methacrylic acid or an acrylic acid-methacrylic acid copolymer that is a copolymer of acrylic acid and methacrylic acid, and is more preferably a polyacrylic acid.

The first resin may be prepared by a reaction between a polymer having a carboxyl group and a crosslinking agent, or may be prepared by polymerizing a crosslinkable monomer with a monomer having a carboxyl group or an alkyl ester group that can undergo hydrolysis reaction to form a carboxyl group. The carboxyl groups included in the first resin may be totally or partially substituted with carboxylates through neutralization with a metal ion. The metal ion is preferably an alkali metal cation. Regarding the timing of the neutralization reaction, it is preferred that the neutralization reaction be performed after preparation of the crosslinked first resin. When the first resin has carboxyl groups that are totally or partially substituted with carboxylates, such a resin is also a kind of the first resin.

Examples of the monomer having an alkyl ester group include: acrylic acid alkyl esters having an alkyl group with 1 to 16 carbon atoms, such as methyl acrylate, ethyl acrylate, propyl acrylate, butyl acrylate, hexyl acrylate, octyl acrylate and lauryl acrylate; itaconic acid alkyl esters having an alkyl group with 1 to 16 carbon atoms, such as methyl itaconate, ethyl itaconate, propyl itaconate, butyl itaconate, hexyl itaconate, octyl itaconate and lauryl itaconate; crotonic acid alkyl esters having an alkyl group with 1 to 16 carbon atoms, such as methyl crotonate, ethyl crotonate, propyl crotonate, butyl crotonate, hexyl crotonate, octyl crotonate and lauryl crotonate; and methacrylic acid alkyl esters having an alkyl group with 1 to 16 carbon atoms, such as methyl methacrylate, ethyl methacrylate, propyl methacrylate, butyl methacrylate, hexyl methacrylate, octyl methacrylate and lauryl methacrylate.

The crosslinkable monomer and the crosslinking agent used in the present invention may be a conventionally known one without any limitation. Examples of the crosslinkable monomer include divinylbenzene, N,N'-methylenebisacrylamide, trimethylolpropane triallyl ether and pentaerythritol tetraallyl ether. Examples of the crosslinking agent include epoxy crosslinking agents, polyvalent glycidyl ethers, polyhydric alcohols, polyvalent isocyanates, polyvalent aziridines, haloepoxy compounds, polyvalent aldehydes, polyvalent amines, organometallic crosslinking agents, and metallic crosslinking agents. It is preferred that the crosslinkable monomer and the crosslinking agent have resistance to alkalis. Any conventionally known approaches may be employed as a method for crosslinking, including thermal crosslinking, ultraviolet crosslinking, electron beam crosslinking, radiation crosslinking, photocrosslinking, and a method described in Japanese Patent Laying-Open No. 2003-268009 or 07-088171. The timing of preparation of the crosslinked first resin is not particularly limited; preferably, the resin is prepared before it is mixed with a $CO_2$ carrier described below.

The first resin may be commercially available one. Examples of the resins having crosslinked polyacrylic acids include AQUPEC (registered trademark, manufactured by SUMITOMO SEIKA CHEMICALS CO., LTD.) and SAN-FRESH (registered trademark, manufactured by Sanyo Chemical Industries, Ltd.).

(Second Resin)

The $CO_2$ gas separation membrane of the present invention includes the first layer (A), the second layer (B) and the hydrophobic porous membrane (C). In comparison with the $CO_2$ gas separation membrane that includes only the first layer (A) containing the first resin in which a polymer having a carboxyl group has been crosslinked and the hydrophobic porous membrane (C), the second layer (B) added therein, i.e. the layer containing the second resin having a structural unit derived from a vinyl ester of a fatty acid, can improve film-forming property. One or more types of the second resin may be used alone or in combination.

The second resin may be one which is obtained by partial saponification of a structural unit derived from a vinyl ester of a fatty acid. When saponified, the structural unit derived from a vinyl ester of a fatty acid provides a hydrophilic vinyl alcohol unit. Therefore, when the second resin has in its structure some residual structural unit derived from a vinyl ester of a fatty acid that is hydrophobic, this hydrophobic fatty acid vinyl ester-derived structural unit has an affinity for the hydrophobic porous membrane (C), which reduces membrane defects such as pinholes, and thus improves the film-forming property. As used herein, the term "degree of saponification" refers to what percentage of the structural unit derived from a vinyl ester of a fatty acid is saponified (hydrolyzed). The degree of saponification is preferably greater than or equal to 50% but less than 100%, more preferably greater than or equal to 60% but less than 100%. The degree of saponification can be adjusted with reference to, for example, Japanese Patent Laying-Open Nos. 52-107096 and 52-27455 and U.S. Pat. No. 5,598,630 including a conventionally known method for resin production.

The second resin may have the structural unit derived from a vinyl ester of a fatty acid with 2 to 16 carbon atoms, such as vinyl acetate, vinyl propionate, vinyl butyrate, vinyl caproate, vinyl laurate, vinyl palmitate, vinyl stearate and vinyl versatate. Examples of the resin include those obtained by partial saponification of the structural unit derived from the above-mentioned vinyl esters of fatty acids, such as polyvinyl alcohol, a vinyl alcohol-ethylene copolymer, a vinyl alcohol-acrylic acid copolymer, a vinyl alcohol-methacrylic acid copolymer, and a vinyl alcohol-vinylsulfonic acid copolymer. Especially, the second resin is preferably a polyvinyl alcohol or vinyl alcohol-acrylic acid copolymer, each of which is obtained by partial saponification of the structural unit derived from the vinyl ester of a fatty acid.

When the second resin used is one of carboxyl group-containing polymers such as a vinyl alcohol-acrylic acid copolymer, the carboxyl groups may be totally or partially substituted with carboxylates through neutralization with a metal ion as in the first resin. The metal ion is preferably an alkali metal cation. When the second resin has carboxyl groups that are totally or partially substituted with carboxylates, such a resin is also a kind of the second resin.

($CO_2$ Carrier)

The $CO_2$ gas separation membrane of the present invention achieves high permselectivity for a specific gas due to a facilitated transport mechanism that includes a substance, called a $CO_2$ carrier, capable of making reversible reaction with $CO_2$ to facilitate permeation of a specific gas in the form of a reaction product with the $CO_2$ carrier, as well as a solution-diffusion mechanism that utilizes a difference in solubility and diffusivity of gas molecules in a membrane. The following formula (1) represents a reaction between $CO_2$ and a $CO_2$ carrier when the $CO_2$ carrier used therein is cesium carbonate ($Cs_2CO_3$). The reaction represented by the following formula (1) is a reversible reaction.

[Formula 1]

$$CO_2 + Cs_2CO_3 + H_2O \rightleftarrows 2CsHCO_3 \qquad (1)$$

The first layer (A) and the second layer (B) in the $CO_2$ gas separation membrane of the present invention each contain at least one alkali metal compound (hereinafter sometimes referred to as "$CO_2$ carrier") selected from the group consisting of an alkali metal carbonate, an alkali metal bicarbonate and an alkali metal hydroxide. The $CO_2$ carrier, as expressed by the formula (1), undergoes the reversible reaction with $CO_2$ which has been dissolved in water in the first layer (A) and the second layer (B), so that the carrier can play a role in selective permeation of $CO_2$. The first layer (A) and the second layer (B) may each contain one or more types of the $CO_2$ carrier.

The alkali metal compounds ("$CO_2$ carriers") contained in the first layer (A) and the second layer (B) are each preferably a carbonate, bicarbonate or hydroxide of at least one alkali metal selected from the group consisting of sodium, potassium, rubidium and cesium, more preferably a carbonate or hydroxide thereof. Examples of the alkali metal carbonate include sodium carbonate, potassium carbonate, rubidium carbonate, and cesium carbonate. Examples of the alkali metal bicarbonate include sodium bicarbonate, potassium bicarbonate, rubidium bicarbonate, and cesium bicarbonate. Examples of the alkali metal hydroxide include sodium hydroxide, potassium hydroxide, rubidium hydroxide, and cesium hydroxide.

Further preferably, the alkali metal compounds ("$CO_2$ carriers") contained in the first layer (A) and the second layer (B) are each an alkali metal carbonate or alkali metal hydroxide which is deliquescent, particularly preferably cesium carbonate or cesium hydroxide having a high water solubility.

For the purpose of further improving $CO_2$ permeance, it is preferred that carboxyl groups contained in the first and second resins be neutralized by cations of alkali metal included in the $CO_2$ carrier so that the alkali metal carbonate, alkali metal bicarbonate or alkali metal hydroxide added can function as a $CO_2$ carrier.

The first layer (A) and the second layer (B) in the $CO_2$ gas separation membrane of the present invention may contain, in addition to the alkali metal compound derived from the $CO_2$ carrier, various alkali metal compounds such as those used in neutralization of the carboxyl groups contained in the first and second resins. The total amount of alkali metal compounds contained in the first layer (A) and the second layer (B) of the $CO_2$ gas separation membrane is preferably 0.5 parts by mass to 20 parts by mass based on 1 part by mass of a total amount of the first and second resins. When the total amount of alkali metal compounds contained is less than 0.5 parts by mass based on 1 part by mass of the total amount of the first and second resins, the desired $CO_2$ permselectivity may not be obtained. On the other hand, when the total amount of alkali metal compounds contained is greater than 20 parts by mass based on 1 part by mass of the total amount of the first and second resins, the film-forming property may be impaired. The total amount of alkali metal compounds contained is more preferably 1 part by mass to 15 parts by mass based on 1 part by mass of the total amount of the first and second resins.

The type of alkali metal compound in the first layer (A) may be the same as or different from that in the second layer (B). The first layer (A) and the second layer (B) may each contain only one type of the alkali metal compound or two or more types of such compounds.

(Hydrophobic Porous Membrane)

The $CO_2$ gas separation membrane of the present invention has the hydrophobic porous membrane (C) that is a hydrophobic porous membrane with high gas permeability that does not have a gas diffusion resistance against a gas component that has permeated through the membrane. When the first layer (A) or second layer (B) is placed in contact with a surface of the porous membrane, the use of the hydrophobic porous membrane (C) as the porous membrane may prevent water in the first layer (A) or the second layer (B) from entering the pores of the porous membrane, and thereby suppress reduction in $CO_2$ permeance. The layer placed in contact with a surface of the hydrophobic porous membrane (C) is preferably the second layer (B). In this case, the first layer (A) is placed in contact with the surface (outer surface) of the second layer (B) on the side not in contact with the hydrophobic porous membrane (C).

In the process of the hydrogen or urea production to which the $CO_2$ gas separation membrane of the present invention is to be applied, the gas separation membrane may be used at a temperature of higher than or equal to 100° C. Therefore, it is preferred that the hydrophobic porous membrane (C) or other members included in the gas separation membrane have a heat resistance of higher than or equal to 100° C.

The term "hydrophobic" means that the water contact angle at 25° C. is greater than or equal to 90° C. The "heat resistance of higher than or equal to 100° C." means that a member such as the porous membrane can be kept under a temperature condition of higher than or equal to 100° C. for 2 hours or longer in the same form maintained as before being kept under such a condition, without visible curling of the membrane due to heat shrinkage or thermal fusion.

The hydrophobic porous membrane (C) may be made from, for example, polyethylene, polypropylene or other polyolefin resins; polytetrafluoroethylene (PTFE), polyvinyl fluoride, polyvinylidene fluoride or other fluorine-containing resins; polyphenylene sulfide; polyether sulfone; polyimide; high molecular weight polyester; heat resistant polyamide; aramid; polycarbonate or other resin materials; or metals, glass, ceramic or other inorganic materials. Among these materials, PTFE, polyvinyl fluoride, polyvinylidene fluoride or other fluorine-containing resins, polyphenylene sulfide, polyether sulfone, polyimide, or ceramic is preferred in terms of water repellency and heat resistance; more preferred is PTFE because it may readily provide micro pore size, and give a high porosity to achieve an increased energy efficiency in gas separation.

The thickness of the hydrophobic porous membrane (C) is not particularly limited. Usually, from the viewpoint of the mechanical strength, the hydrophobic porous membrane (C) preferably has a thickness of 10 µm to 3000 µm, more preferably 10 µm to 500 µm, further preferably 15 µm to 150 µm.

While the average size of pores (average pore size) in the hydrophobic porous membrane (C) is not particularly limited, it is preferably smaller than or equal to 10 µm, more preferably 0.005 µm to 1.0 µM from the standpoint of gas permeability. The porosity of the hydrophobic porous membrane (C) is preferably 5% to 99%, more preferably 30% to 90% from the standpoint of energy efficiency in gas separation.

In stacking the first layer (A) containing the first resin and the second layer (B) containing the second resin, the stacking order of the layers is not limited in the $CO_2$ gas separation membrane of the present invention. For example, a surface of the first layer (A) containing the first resin is in contact with a surface of the second layer (B) containing the second resin; and either the other surface of the first layer (A) or the other surface of the second layer (B) is in contact with a surface of the hydrophobic porous membrane (C) to form the laminate structure including the first layer (A), the second layer (B) and the hydrophobic porous membrane (C). In this case, it is preferred from the standpoint of $CO_2$ permeance that a weight per unit area (solid weight per unit area) of one of the first layer (A) and the second layer (B), which is not in contact with the hydrophobic porous membrane (C), is higher than that of the other layer in contact with the hydrophobic porous membrane (C). Moreover, from the standpoint of $CO_2$ permeance, preferably the stacking order of the membrane structure is as follows: the first layer (A) containing the first resin that has a higher water retention capacity than the second resin has; the second layer (B) containing the second resin; and the hydrophobic porous membrane (C).

(Additive)

The first layer (A) and the second layer (B) may contain a $CO_2$ hydration catalyst in addition to the $CO_2$ carrier.

The $CO_2$ hydration catalyst is a catalyst that increases the rate of reaction in the $CO_2$ hydration reaction represented by the following formula (2). The reaction represented by the following formula (2) is a reversible reaction.

[Formula 2]

$$CO_2 + H_2O \rightleftarrows HCO_3^- + H^+ \qquad (2)$$

An overall reaction equation of a reaction between $CO_2$ and the $CO_2$ carrier may be represented by the following formula (3), wherein it is assumed that the $CO_2$ carrier is a carbonate. The reaction represented by the following formula (3) is a reversible reaction. The above-mentioned $CO_2$ hydration reaction which is an elementary reaction for the reaction of formula (3) proceeds at a slow rate under a catalyst-free condition. Thus, the addition of the catalyst accelerates the elementary reaction, thereby accelerating the reaction between $CO_2$ and the $CO_2$ carrier; as a result, the rate of the $CO_2$ permeation is expected to be increased.

[Formula 3]

$$CO_2 + H_2O + CO_3^{2-} \rightleftarrows 2HCO_3^- \qquad (3)$$

Therefore, the inclusion of the $CO_2$ carrier and $CO_2$ hydration catalyst in the first layer (A) and the second layer (B) accelerates the reaction between $CO_2$ and the $CO_2$ carrier, and results in significantly improved $CO_2$ permeance and $CO_2$ permselectivity. Since the $CO_2$ hydration catalyst can function effectively even under a high partial pressure of $CO_2$, the $CO_2$ permeance and $CO_2$ permselectivity under a high partial pressure of $CO_2$ may also be significantly improved.

The $CO_2$ hydration catalyst preferably contains an oxoacid compound, particularly, an oxoacid compound with at least one element selected from Group 14, 15 and 16 elements, and more preferably contains at least one of a tellurious acid compound, a selenious acid compound, an arsenious acid compound and an orthosilicic acid compound. More specifically, potassium tellurite ($K_2TeO_3$, melting point: 465° C.), sodium tellurite ($Na_2TeO_3$, melting point: 710° C.), lithium tellurite ($Li_2O_3Te$, melting point: about 750° C.), potassium selenite ($K_2O_3Se$, melting point: 875° C.), sodium arsenite ($NaO_2As$, melting point: 615° C.), sodium orthosilicate ($Na_4O_4Si$, melting point: 1018° C.) or the like may be suitably used. Among these, a tellurious acid compound is more preferred, and further preferred is potassium tellurite or sodium tellurite. The first layer (A) and the second layer (B) may each contain one or more $CO_2$ hydration catalysts.

When the $CO_2$ hydration catalyst has a melting point of higher than or equal to 200° C., the catalyst may be present with thermal stability in a hydrophilic resin-containing layer, and therefore it is possible to maintain the performance of the $CO_2$ gas separation membrane for a long period of time. If the $CO_2$ hydration catalyst is soluble in water, the separation-functional layer that contains the $CO_2$ hydration catalyst may be prepared in an easy and stable manner. When a tellurious acid compound, an arsenious acid compound or a selenious acid compound is used as the $CO_2$ hydration catalyst, it can be expected that the membrane would be provided with improved performance in a stable manner because any of these compounds is soluble in water and has a melting point of higher than or equal to 200° C.

(Method for Manufacturing $CO_2$ Gas Separation Membrane)

The method for manufacturing the $CO_2$ gas separation membrane of the present invention will be described. In the first step, a first coating liquid containing: the alkali metal compound; the first resin in which a polymer having a carboxyl group has been crosslinked; and a medium, or a second coating liquid containing: the alkali metal compound; the second resin having a structural unit derived from a vinyl ester of a fatty acid; and a medium is applied onto at least one surface of the hydrophobic porous membrane (C).

Examples of the medium used for preparing the first coating liquid and the second coating liquid include polar protonic media such as water, methanol, ethanol, 1-propanol, 2-propanol and other alcohols; non-polar media such as toluene, xylene and hexane; and polar aprotic media such as acetone, methyl ethyl ketone, methyl isobutyl ketone or other ketones, N-methylpyrrolidone, N,N-dimethylacetamide and N,N-dimethylformamide. These media may be used alone or in admixture of two or more thereof as long as they are compatible. Among these, preferred media are those containing at least one selected from the group consisting of water, methanol, ethanol, 1-propanol, 2-propanol and other alcohols. More preferred media are those containing water.

The temperature of the coating liquid in its application onto the hydrophobic porous membrane (C) can be selected as appropriate in accordance with the composition or concentration of the liquid. If the temperature is excessively high, however, a large amount of the medium may be vaporized from the coating liquid and the composition and concentration of the liquid may be changed, or scars may be left by vaporization on the coating (coating layer). Therefore, the temperature of the coating liquid is preferably higher than or equal to room temperature and lower than or equal to a temperature 5° C. below the boiling point of the medium to be employed. For example, if water is employed as the medium, it is preferred that the coating liquid be applied onto the hydrophobic porous membrane (C) at a temperature of 15° C. to 95° C.

The coating liquid can be applied onto the hydrophobic porous membrane (C) by any method that is not particularly limited. Examples of such application method include spin coating, bar coating, die coating, blade coating, air knife coating, gravure coating, roll coating, spray coating, dip coating, comma roll coating, kiss coating, screen printing and ink jet printing. It is preferred that the amount of the coating liquid applied be adjusted according to the type of resin contained in the coating liquid. When the coating liquid used contains the first resin, the weight thereof per unit area (solid weight per unit area) is, for example, 0.1 g/m² to 1000 g/m², preferably 0.1 g/m² to 500 g/m², more preferably 0.5 g/m² to 300 g/m², further preferably 1 g/m² to 100 g/m². When the coating liquid used contains the second resin, the weight thereof per unit area is, for example, 1 g/m² to 1000 g/m², preferably 2 g/m² to 750 g/m², more preferably 4 g/m² to 500 g/m², further preferably 5 g/m² to 100 g/m². It is possible to control these weights per unit area by optimizing the coating formation speed (that is, for example, the feed rate of the hydrophobic porous membrane (C) on which the coating liquid is to be applied), the concentration or discharge rate of the coating liquid, or other factors.

In the second step, the medium is removed from the coating (coating layer) formed in the first step to prepare the first layer (A) or the second layer (B). The medium can be removed by any method without limitation. While any conventionally known method may be used to remove the medium, it is preferred to employ such a method that the coating is dried by forced-air drying with heated air or the like to remove the medium by evaporation. For example, the coating is conveyed into a forced-air dryer set at a predetermined temperature and a predetermined humidity to remove the medium from the coating by evaporation. The first layer (A) or the second layer (B) is formed by this operation.

The drying temperature may be selected as appropriate according to the medium of the coating liquid and the type of the hydrophobic porous membrane (C). Usually, it is preferred that the drying temperature be higher than the freezing point of the medium and lower than the melting point of the hydrophobic porous membrane (C). Generally, a suitable temperature is 80° C. to 200° C.

The medium removal operation is performed until the concentration of the medium in the coating is decreased to a predetermined level or lower. Specifically, it is preferred that the removal operation be performed until the medium content in the first layer (A) or the second layer (B) obtained in the second step reaches 1% by weight to 34% by weight.

In the third step, one of the first coating liquid and the second coating liquid, which is different from the coating liquid used in the first step, is applied onto a surface (outer surface) of the first layer (A) or the second layer (B) prepared in the second step. The coating liquid is preferably applied by the same method as that used in the first step for coating liquid application, although it is possible to employ a different method. The temperature of the coating liquid in its application in the third step, as in the first step, can be selected as appropriate in accordance with the composition or concentration of the liquid applied. It is preferred that the amount of the coating liquid applied be adjusted according to the type of resin contained in the coating liquid, as in the first step.

In the fourth step, the first layer (A) or the second layer (B) is prepared by removing the medium from the coating (coating layer) obtained in the third step. The medium is preferably removed by the same method as that used in the second step, although it is possible to employ a different method. The drying temperature may be selected as appropriate according to the medium of the coating liquid and the type of the hydrophobic porous membrane (C), as in the second step.

The $CO_2$ gas separation membrane is preferably manufactured by the method wherein the second coating liquid is applied onto at least one surface of the hydrophobic porous membrane (C) in the first step; the second layer (B) is prepared in the second step; the first coating liquid is applied onto a surface of the second layer (B) in the third step; and the first layer (A) is obtained in the fourth step. When this method is employed, it is preferred that the weights per unit area of the first layer (A) containing the first resin and of the second layer (B) containing the second resin be 2 g/m$^2$ to 500 g/m$^2$ and 1 g/m$^2$ to 20 g/m$^2$, respectively, and it is more preferred that the weights per unit area of the first layer (A) containing the first resin and of the second layer (B) containing the second resin be 10 g/m$^2$ to 300 g/m$^2$ and 2 g/m$^2$ to 15 g/m$^2$, respectively, from the standpoint of $CO_2$ permselectivity. Furthermore, the weight per unit area of the first layer (A) is preferably greater than that of the second layer (B) from the standpoint of $CO_2$ permselectivity. The proportion of the weight per unit area of the second layer (B) to that of the first layer (A) (hereinafter also referred to as "proportion of the weight per unit area" simply), that is, the value obtained by dividing the weight per unit area of the second layer (B) by that of the first layer (A), is preferably within the range of from 0.04 to 0.5, more preferably within the range of from 0.05 to 0.2.

<$CO_2$ Gas Separation Membrane Module and $CO_2$ Gas Separation Apparatus>

Figure 1:
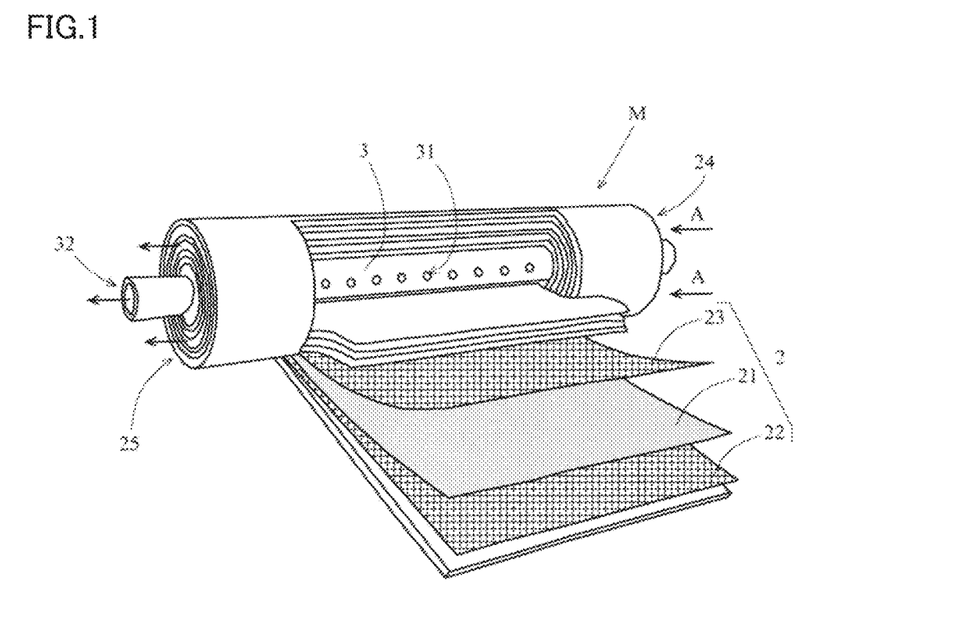
FIG. 1 is a schematic view with partial cutaway showing a structure of a spiral-wound $CO_2$ gas separation membrane module including a gas separation membrane of the present invention.

The $CO_2$ gas separation membrane module of the present invention includes the $CO_2$ gas separation membrane of the present invention, and may be of any type such as spiral-wound type, tube type, hollow fiber type, pleated type, and plate-and-frame type. FIG. 1 shows a schematic view with partial cutaway showing a structure of a spiral-wound $CO_2$ gas separation membrane module including the $CO_2$ gas separation membrane of the present invention.

A spiral-wound $CO_2$ gas separation membrane module M shown in FIG. 1 has a structure in which a laminate 2 is plurally wrapped around an outer periphery of a hollow gas-collecting tube 3 with a plurality of holes 31 formed therein, laminate 2 including a $CO_2$ gas separation membrane 21, a feed-side channel member 22 and a permeate-side channel member 23 in a laminated manner. It is preferred that feed-side channel member 22 and permeate-side channel member 23 have the capability of accelerating turbulent flow of a gas mixture fed containing $CO_2$ and water vapor and a permeate gas that has permeated through $CO_2$ gas separation membrane 21 (surface renewal of the membrane surface) to increase the rate of permeation of $CO_2$ in the fed fluid through the membrane; and the capability of minimizing pressure drop at the feed side. Feed-side channel member 22 and permeate-side channel member 23 that are of mesh type may be suitably employed because these members preferably have the capability of serving as a spacer and the capability of generating turbulent flow in the gas mixture. The unit cell of the mesh may have a shape selected from, for example, rhombus, parallelogram and others according to the intended use, considering that the flow path of the gas mixture may be changed by the shape of the mesh. While feed-side channel member 22 and permeate-side channel member 23 may be made from any material without limitation, it is preferred that a heat-resistant material be employed because the gas separation membrane of the present invention will be used under a temperature condition of higher than or equal to 100° C. The same materials as those of the hydrophobic porous membrane (C) listed above are preferably employed for the feed-side and permeate-side channel members.

The $CO_2$ gas separation apparatus of the present invention includes the $CO_2$ gas separation membrane module of the present invention and a gas feeding part for feeding a gas mixture that contains at least $CO_2$ and water vapor to the $CO_2$ gas separation membrane module. The gas feeding part includes an inlet for feeding the gas mixture that contains $CO_2$ and water vapor on a surface side of the $CO_2$ gas separation membrane, and may exist as the inlet of the $CO_2$ gas separation membrane module, or may be a gas feeding member enclosing the $CO_2$ gas separation membrane module in its container-shaped structure that has an internal feed-side space communicated with the inlet of the enclosed $CO_2$ gas separation membrane module. The inlet may be located on a surface of the $CO_2$ gas separation membrane or of the laminate including the membrane, or may be at an end face of the $CO_2$ gas separation membrane or of the laminate including the membrane. For example, in spiral-wound $CO_2$ gas separation membrane module M shown in FIG. 1, an inlet 24 may be located at one or both of the end faces of $CO_2$ gas separation membrane 21 or of laminate 2 including the membrane.

<Method for Separating $CO_2$>

The method for separating $CO_2$ of the present invention includes the steps of: feeding a gas mixture that contains at least $CO_2$ and water vapor on a surface side of the $CO_2$ gas separation membrane according to the present invention; and recovering $CO_2$ separated from the gas mixture through the other surface side of the $CO_2$ gas separation membrane. In spiral-wound $CO_2$ gas separation membrane module M of the above-mentioned structure, the gas mixture containing $CO_2$ and water vapor is fed through inlet 24 provided in $CO_2$ gas separation membrane module M in the direction of arrow A, and during flowing through feed-side channel member 22, $CO_2$ in the gas mixture permeates through $CO_2$ gas separation membrane 21. The permeated $CO_2$ flows through permeate-side channel member 23, is collected in gas-collecting tube 3, and is then recovered through an outlet 32 of gas-collecting tube 3. The retentate gas mixture after $CO_2$ separation passes through a space of feed-side channel member 22, and is discharged from an outlet 25 of $CO_2$ gas separation membrane module M. A sweep gas selected from inert gases or others may be fed to gas-collecting tube 3.

EXAMPLES

The present invention is further illustrated, but is not to be construed as limited, by the following examples.

Example 1

A mixture was prepared by stirring 80 g of water and 2 g of a crosslinked polyacrylic acid ("AQUPEC HV-501" manufactured by SUMITOMO SEIKA CHEMICALS CO., LTD.). Then, 9.3 g of cesium carbonate and 0.7 g of potassium tellurite were added to the mixture, and further mixed by stirring to prepare coating liquid I-1.

Another mixture was prepared by stirring 80 g of water and 4.2 g of a vinyl alcohol-acrylic acid copolymer (degree of saponification: 82%, carboxyl groups of acrylic acid units form Cs salt) obtained by the production method according to U.S. Pat. No. 5,598,630 publication. Then, 9.9 g of cesium carbonate and 1.5 g of potassium tellurite were added to the mixture, and further mixed by stirring to prepare coating liquid I-2.

Subsequently, the prepared coating liquid I-2 was applied onto the surface of a hydrophobic PTFE porous membrane ("POREFLON HP-010-50", membrane thickness: 50 μm, average pore size: 0.1 μm, manufactured by Sumitomo Electric Fine Polymer, Inc.). The hydrophobic PTFE porous membrane with the coating liquid applied thereon was then dried at a temperature of about 120° C. for longer than or equal to 5 minutes to form resin layer I-2. Thereafter, coating liquid I-1 was applied onto the surface of resin layer I-2, and was then dried again at a temperature of about 120° C. for longer than or equal to 5 minutes to form resin layer I-1 deposited thereon, thereby obtaining sheet-like gas separation membrane I having a $CO_2$ separation-functional layer formed on the hydrophobic PTFE porous membrane. Resin layer I-1 (corresponding to the first layer (A)) had a weight per unit area of 66 g/m², and resin layer I-2 (corresponding to the second layer (B)) had a weight per unit area of 5 g/m².

The proportion of the weight per unit area was 0.076.

Example 2

Gas separation membrane II was obtained in the same manner as in Example 1 except that the amount of cesium carbonate added in the coating liquid I-1 preparation step of Example 1 was increased to 11.6 g to prepare coating liquid II-1. Resin layer II-1 (corresponding to the first layer (A)) had a weight per unit area of 68 g/m², and resin layer II-2 (corresponding to the second layer (B)) had a weight per unit area of 7.6 g/m². The proportion of the weight per unit area was 0.11.

Example 3

Gas separation membrane III was obtained in the same manner as in Example 1 except that the amount of cesium carbonate added in the coating liquid I-1 preparation step of Example 1 was increased to 14.0 g to prepare coating liquid III-1. Resin layer III-1 (corresponding to the first layer (A)) had a weight per unit area of 79 g/m², and resin layer III-2 (corresponding to the second layer (B)) had a weight per unit area of 7.6 g/m². The proportion of the weight per unit area was 0.096.

Example 4

A mixture was prepared by stirring 80 g of water and 2 g of a crosslinked polyacrylic acid ("AQUPEC HV-501" manufactured by SUMITOMO SEIKA CHEMICALS CO., LTD.). Then, 9.3 g of cesium carbonate and 0.7 g of potassium tellurite were added to the mixture, and further mixed by stirring to prepare coating liquid IV-1.

Another mixture was prepared by stirring 80 g of water and 4.2 g of a vinyl alcohol-acrylic acid copolymer (degree of saponification: 82%, carboxyl groups of acrylic acid units form Cs salt) obtained by the production method according to U.S. Pat. No. 5,598,630 publication. Then, 9.9 g of cesium carbonate and 1.5 g of potassium tellurite were added to the mixture, and further mixed by stirring to prepare coating liquid IV-2.

Subsequently, the prepared coating liquid IV-1 was applied onto the surface of a hydrophobic PTFE porous membrane ("POREFLON HP-010-50", membrane thickness: 50 μm, average pore size: 0.1 μm, manufactured by Sumitomo Electric Fine Polymer, Inc.). The hydrophobic PTFE porous membrane with the coating liquid applied thereon was then dried at a temperature of about 120° C. for longer than or equal to 5 minutes to form resin layer IV-1. Thereafter, coating liquid IV-2 was applied onto the surface of resin layer IV-1, and was then dried again at a temperature of about 120° C. for longer than or equal to 5 minutes to form resin layer IV-2 deposited thereon, thereby obtaining sheet-like gas separation membrane IV having a $CO_2$ separation-functional layer formed on the hydrophobic PTFE porous membrane. Resin layer IV-1 (corresponding to the first layer (A)) had a weight per unit area of 33 g/m², and resin layer IV-2 (corresponding to the second layer (B)) had a weight per unit area of 60 g/m². The proportion of the weight per unit area was 1.8. In Example 4, the first layer (A) was formed prior to the second layer (B), and a weight per unit area of the first layer (A) is lower than that of the second layer (B) unlike those in Examples 1 to 3.

Comparative Example 1

80 g of water, 3 g of a vinyl alcohol-acrylic acid copolymer (degree of saponification: 82%, carboxyl groups of acrylic acid units form Cs salt) as a hydrophilic resin having a structural unit derived from an aliphatic vinyl ester obtained by the production method according to U.S. Pat.

No. 5,598,630 publication, 7.0 g of cesium carbonate and 1.1 g of potassium tellurite was mixed by stirring to prepare coating liquid V-2.

Subsequently, the prepared coating liquid V-2 was applied onto the surface of a hydrophobic PTFE porous membrane ("POREFLON HP-010-50", membrane thickness: 50 μm, average pore size: 0.1 manufactured by Sumitomo Electric Fine Polymer, Inc.). The hydrophobic PTFE porous membrane with the coating liquid applied thereon was then dried at a temperature of about 120° C. for longer than or equal to 5 minutes to obtain a gas separation membrane having a $CO_2$ separation-functional layer formed on the hydrophobic PTFE porous membrane. The coating liquid application and drying operations were further repeated several times, thereby obtaining sheet-like gas separation membrane V. Gas separation membrane V (corresponding to the second layer (B)) had a weight per unit area of 100 g/m².

Comparative Example 2

188 g of water, 4 g of a crosslinked polyacrylic acid ("AQUPEC HV-501" manufactured by SUMITOMO SEIKA CHEMICALS CO., LTD.) as a hydrophilic resin in which a polymer having a carboxyl group has been crosslinked, and 9.3 g of cesium hydroxide monohydrate was mixed through stirring, thereby carrying out a neutralization reaction. After completion of the neutralization reaction, 9.0 g of cesium carbonate, 1.5 g of potassium tellurite and 1.2 g of a surfactant ("Surflon S-242" manufactured by AGC Seimi Chemical Co., Ltd.) were added thereto, and the materials were mixed to obtain coating liquid VI-1.

Subsequently, the prepared coating liquid VI-1 was applied onto the surface of a hydrophobic PTFE porous membrane ("POREFLON HP-010-50", membrane thickness: 50 μm, average pore size: 0.1 μm, manufactured by Sumitomo Electric Fine Polymer, Inc.). The hydrophobic PTFE porous membrane with the coating liquid applied thereon was then dried at a temperature of about 120° C. for longer than or equal to 5 minutes to obtain a gas separation membrane having a $CO_2$ separation-functional layer formed on the hydrophobic PTFE porous membrane. The coating liquid application and drying operations were further repeated several times, thereby obtaining sheet-like gas separation membrane VI. Gas separation membrane VI (corresponding to the first layer (A)) had a weight per unit area of 100 g/m².

(Evaluation of Film-Forming Property)

Figure 2:
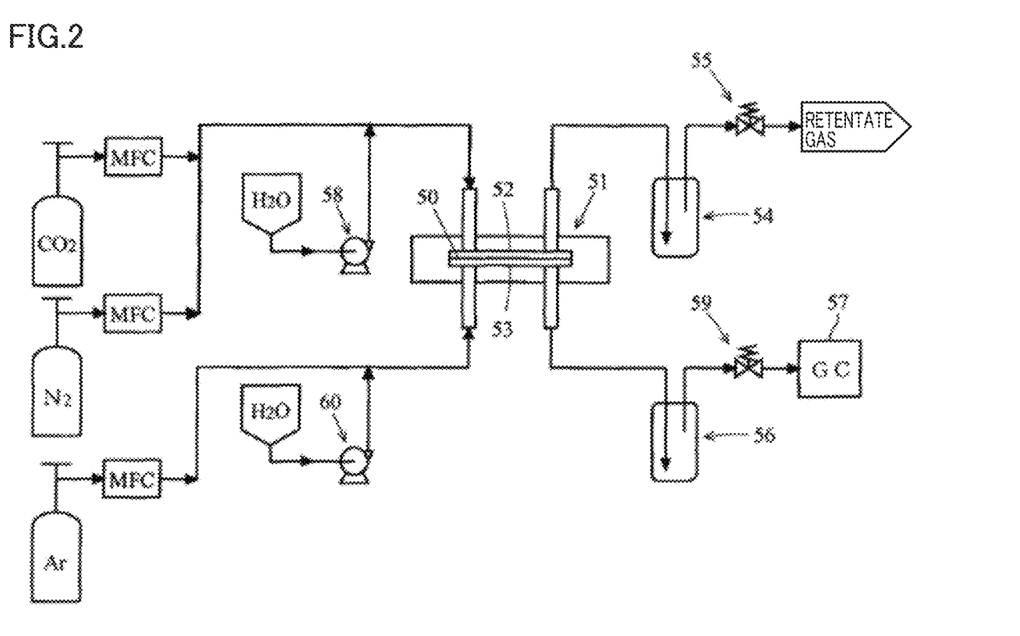
FIG. 2 is a schematic view showing a $CO_2$ gas separation apparatus including a $CO_2$ gas separation membrane module used in examples.

Evaluation of $N_2$ gas permeability was conducted using a $CO_2$ gas separation apparatus including a $CO_2$ gas separation membrane module 51 as shown in FIG. 2. Specifically, gas separation membranes I, IV and VI prepared in Example 1, Example 4 and Comparative Example 2, respectively, were cut into pieces of appropriate size to form flat membranes, and each of these membranes was fixed between a feed side 52 (corresponding the above-mentioned gas feeding part) and a permeate side 53 of stainless-steel $CO_2$ separation membrane module 51.

$N_2$ gas at room temperature was fed to feed side 52 of $CO_2$ gas separation membrane module 51, and then the pressure on feed side 52 was increased to 900 kPaA. The pressure on permeate side 53 was controlled at atmospheric pressure. $N_2$ permeance was calculated based on the change of the pressure on feed side 52 from moment to moment. Samples were graded as acceptable when $N_2$ permeance [mol/(m²·s·kPa)] was lower than or equal to 5×10⁻⁸ mol/(m²·s·kPa). Each ten samples of the gas separation membranes of Examples 1, 4 and Comparative Example 2 were evaluated for their film-forming property. The results are shown in Table 1.

TABLE 1

|  | Acceptance ratio % (Acceptable samples/Tested samples) |
| --- | --- |
| Example 1 | 100 (10/10) |
| Example 4 | 100 (10/10) |
| Comparative Example 2 | 70 (7/10) |

(Evaluation of $CO_2$ Separation Performance)

$CO_2$ separation was performed using a $CO_2$ gas separation apparatus including $CO_2$ gas separation membrane module 51 as shown in FIG. 2. Specifically, gas separation membranes I to VI prepared in Examples 1 to 4 and Comparative Examples 1 and 2, respectively, were cut into pieces of appropriate size to form flat membranes, and each of these membranes was fixed between feed side 52 (corresponding to the above-mentioned gas feeding part) and permeate side 53 of stainless-steel $CO_2$ separation membrane module 51.

A raw gas ($CO_2$: 34.5%, $N_2$: 52.8%, $H_2O$: 12.7%) was fed to feed side 52 of $CO_2$ gas separation membrane module 51 at a flow rate of 7.03×10⁻² mol/min, and a sweep gas ($H_2O$: 100%) was fed to permeate side 53 of $CO_2$ gas separation membrane module 51 at a flow rate of 1.05×10⁻² mol/min. It should be noted that water introduced via fluid-forwarding metering pumps 58 and 60 was heated and evaporated to adjust the $H_2O$ ratio and flow rates as mentioned above. The pressure on feed side 52 was controlled at 900 kPaA by a back-pressure controller 55 provided on the downstream side of a cold trap 54 located about midway in a discharge passage for discharging retentate gas. In addition, a back-pressure controller 59 was provided between a cold trap 56 and a gas chromatograph 57, and was used to control the pressure on permeate side 53 at atmospheric pressure. The flow rate of gas after removal of water vapor by cold trap 56 from the sweep gas discharged through permeate side 53 was quantified based on results of analysis with gas chromatograph 57 to calculate $CO_2$ permeance and $N_2$ permeance [mol/(m²·s·kPa)] regarding $CO_2$ and $N_2$ contained in the permeate gas. Then, $CO_2/N_2$ permeance ratio was calculated to determine the selectivity ($CO_2$ permselectivity). The results are shown in Table 2.

It should be noted that $CO_2$ gas separation membrane module 51 and pipes for feeding raw gas and sweep gas to $CO_2$ gas separation membrane module 51 were disposed in a thermostatic chamber (not shown) set at a predetermined temperature in order to maintain $CO_2$ gas separation membrane module 51 as well as the raw and sweep gases at constant temperature. This evaluation of $CO_2$ separation performance was conducted under conditions that the temperature of $CO_2$ gas separation membrane module 51 and those of raw and sweep gases were maintained at 110° C.

TABLE 2

| | Stacking order | First resin-containing layer | | | | | Second resin-containing layer Second resin Type |
|---|---|---|---|---|---|---|---|
| | | First resin Type | Alkali metal compound | | $CO_2$ hydration catalyst | | |
| | | | Type | Amount added per weight of first resin g/g | Type | Amount added per weight of first resin g/g | |
| Example 1 | First resin-containing layer Second resin-containing layer Hydrophobic porous membrane | Crosslinked polyacrylic acid | $Cs_2CO_3$ | 4.7 | $K_2TeO_3$ | 0.36 | Vinyl alcohol-acrylic acid copolymer (Cs salt) |
| Example 2 | First resin-containing layer Second resin-containing layer Hydrophobic porous membrane | Crosslinked polyacrylic acid | $Cs_2CO_3$ | 5.8 | $K_2TeO_3$ | 0.36 | Vinyl alcohol-acrylic acid copolymer (Cs salt) |
| Example 3 | First resin-containing layer Second resin-containing layer Hydrophobic porous membrane | Crosslinked polyacrylic acid | $Cs_2CO_3$ | 7.0 | $K_2TeO_3$ | 0.36 | Vinyl alcohol-acrylic acid copolymer (Cs salt) |
| Example 4 | Second resin-containing layer First resin-containing layer Hydrophobic porous membrane | Crosslinked polyacrylic acid | $Cs_2CO_3$ | 4.7 | $K_2TeO_3$ | 0.36 | Vinyl alcohol-acrylic acid copolymer (Cs salt) |
| Comparative Example 1 | Second resin-containing layer Hydrophobic porous membrane | — | — | — | — | — | Vinyl alcohol-acrylic acid copolymer (Cs salt) |
| Comparative Example 2 | First resin-containing layer Hydrophobic porous membrane | Crosslinked polyaciylic acid | CsOH•$H_2O$ $Cs_2CO_3$ | 2.3 2.3 | $K_2TeO_3$ | 0.36 | — |

| | Second resin-containing layer | | | | | | |
|---|---|---|---|---|---|---|---|
| | Second resin Degree of saponification % | Alkali metal compound | | $CO_2$ hydration catalyst | | $CO_2$ permeance mol/ ($m^2$s kPa) | $CO_2/N_2$ selectivity |
| | | Type | Amount added per weight of second resin g/g | Type | Amount added per weight of second resin g/g | | |
| Example 1 | 82 | $Cs_2CO_3$ | 2.4 | $K_2TeO_3$ | 0.36 | $3.01 \times 10^{-5}$ | 707 |
| Example 2 | 82 | $Cs_2CO_3$ | 2.4 | $K_2TeO_3$ | 0.36 | $3.91 \times 10^{-5}$ | 934 |
| Example 3 | 82 | $Cs_2CO_3$ | 2.4 | $K_2TeO_3$ | 0.36 | $3.30 \times 10^{-5}$ | 710 |
| Example 4 | 82 | $Cs_2CO_3$ | 2.4 | $K_2TeO_3$ | 0.36 | $2.39 \times 10^{-5}$ | 872 |
| Comparative Example 1 | 82 | $Cs_2CO_3$ | 2.3 | $K_2TeO_3$ | 0.36 | $2.69 \times 10^{-5}$ | 294 |
| Comparative Example 2 | — | — | — | — | — | $1.98 \times 10^{-5}$ | 44 |

INDUSTRIAL APPLICABILITY

The gas separation membrane of the present invention can be utilized to separate $CO_2$ from a $CO_2$-containing gas mixture at a high permselectivity coefficient, for example, in a decarbonation step of large-scale processes such as hydrogen or urea production, or in a $CO_2$-permeable membrane reactor.

REFERENCE SIGNS LIST

2: Laminate, 3: Gas-collecting tube, M: Spiral-wound $CO_2$ gas separation membrane module, 21: $CO_2$ gas separation membrane, 22: Feed-side channel member, 23: Permeate-side channel member, 24: Inlet, 25: Outlet, 31: Hole, 32: Outlet, 50: $CO_2$ gas separation membrane, 51: $CO_2$ gas separation membrane module, 52: Feed side of $CO_2$ gas separation membrane module, 53: Permeate side of $CO_2$ gas separation membrane module, 54, 56: Cold trap, 55, 59: Back-pressure controller, 57: Gas chromatograph, 58, 60: Fluid-forwarding pump

The invention claimed is:

1. A $CO_2$ gas separation membrane, comprising:
    a first layer (A) including at least one alkali metal compound selected from the group consisting of an alkali metal carbonate, an alkali metal bicarbonate and an alkali metal hydroxide, and a first resin in which a polymer having a carboxyl group has been crosslinked;

a second layer (B) including at least one alkali metal compound selected from the group consisting of an alkali metal carbonate, an alkali metal bicarbonate and an alkali metal hydroxide, and a second resin having a structural unit derived from a vinyl ester of a fatty acid; and a hydrophobic porous membrane (C), wherein the polymer having a carboxyl group is a polyacrylic acid homopolymer, a polyitaconic acid homopolymer, a polycrotonic acid homopolymer, or a polymethacrylic acid homopolymer, and the second resin is a polyvinyl alcohol, a vinyl alcohol-ethylene copolymer, a vinyl alcohol-acrylic acid copolymer, a vinyl alcohol-methacrylic acid copolymer, or a vinyl alcohol-vinylsulfonic acid copolymer.

2. The $CO_2$ gas separation membrane according to claim 1, wherein
the second resin is a polyvinyl alcohol or vinyl alcohol-acrylic acid copolymer, the polyvinyl alcohol or the vinyl alcohol-acrylic acid copolymer being a partially saponified product of a vinyl ester of a fatty acid.

3. The $CO_2$ gas separation membrane according to claim 1, wherein
a surface of the first layer (A) is in contact with a surface of the second layer (B), and a surface of the hydrophobic porous membrane (C) is in contact with one of the other surface of the first layer (A) and the other surface of the second layer (B).

4. The $CO_2$ gas separation membrane according to claim 3, wherein
a weight per unit area of one of the first layer (A) and the second layer (B), which is not in contact with the hydrophobic porous membrane (C), is higher than that of the other layer in contact with the hydrophobic porous membrane (C).

5. The $CO_2$ gas separation membrane according to claim 1, wherein
the first layer (A), the second layer (B), and the hydrophobic porous membrane (C) are stacked in this order.

6. The $CO_2$ gas separation membrane according to claim 1, wherein
the first resin has a structural unit that is derived from an acrylic or methacrylic acid or a derivative thereof.

7. The $CO_2$ gas separation membrane according to claim 1, wherein
a total amount of alkali metal compounds contained in the first layer (A) and the second layer (B) is 0.5 parts by mass to 20 parts by mass based on 1 part by mass of a total amount of the first and second resins.

8. The $CO_2$ gas separation membrane according to claim 1, wherein
the alkali metal compounds contained in the first layer (A) and the second layer (B) are each a carbonate or hydroxide of at least one alkali metal selected from the group consisting of sodium, potassium, rubidium and cesium.

9. The $CO_2$ gas separation membrane according to claim 1, wherein
the alkali metal compounds contained in the first layer (A) and the second layer (B) are each cesium carbonate or cesium hydroxide.

10. The $CO_2$ gas separation membrane according to claim 1, wherein
the hydrophobic porous membrane (C) includes at least one material selected from the group consisting of ceramic, a fluorine-containing resin, polyphenylene sulfide, polyether sulfone, and polyimide.

11. The $CO_2$ gas separation membrane according to claim 1, wherein
the hydrophobic porous membrane (C) has pores with an average pore diameter of 0.005 μm to 1.0 μm.

12. A method for manufacturing the $CO_2$ gas separation membrane according to claim 1, comprising:
a first step of applying a first coating liquid containing the alkali metal compound, the first resin and a medium or a second coating liquid containing the alkali metal compound, the second resin and a medium onto at least one surface of the hydrophobic porous membrane (C);
a second step of forming the first layer (A) or the second layer (B) by removing the medium from a coating obtained in the first step;
a third step of applying one of the first coating liquid and the second coating liquid, which is different from the coating liquid used in the first step, onto a surface of the first layer (A) or the second layer (B) formed in the second step; and
a fourth step of forming the first layer (A) or the second layer (B) by removing the medium from a coating obtained in the third step.

13. The method according to claim 12, wherein
the first step is a step of applying the second coating liquid onto at least one surface of the hydrophobic porous membrane (C).

14. A method for separating $CO_2$, comprising the steps of:
feeding a gas mixture that contains at least $CO_2$ and water vapor on a surface side of the $CO_2$ gas separation membrane according to claim 1; and
recovering $CO_2$ separated from the gas mixture through the other surface side of the $CO_2$ gas separation membrane.

15. A $CO_2$ gas separation membrane module comprising the $CO_2$ gas separation membrane according to claim 1.

16. A $CO_2$ gas separation apparatus, comprising:
the $CO_2$ gas separation membrane module according to claim 15; and
a gas feeding part for feeding a gas mixture that contains at least $CO_2$ and water vapor to the $CO_2$ gas separation membrane module.

* * * * *